United States Patent
Diez et al.

(10) Patent No.: US 11,826,213 B2
(45) Date of Patent: Nov. 28, 2023

(54) METHOD FOR PRODUCING A GUIDE RAIL FOR MACHINING PROSTHETIC TEETH

(71) Applicant: Kulzer GmbH, Hanau (DE)

(72) Inventors: Lars Hendrik Diez, Hanau (DE); Stephan Dekert, Wehrheim (DE); Roger Ritzel, Biebergemünd (DE)

(73) Assignee: Kulzer GmbH, Hanau (DE)

(*) Notice: Subject to any disclaimer, the term of this patent is extended or adjusted under 35 U.S.C. 154(b) by 391 days.

(21) Appl. No.: 17/126,850

(22) Filed: Dec. 18, 2020

(65) Prior Publication Data

US 2021/0205056 A1    Jul. 8, 2021

(30) Foreign Application Priority Data

Jan. 3, 2020  (EP) .................................. 20150234

(51) Int. Cl.
*A61C 13/00* (2006.01)
*A61C 13/275* (2006.01)

(52) U.S. Cl.
CPC ...... *A61C 13/0004* (2013.01); *A61C 13/0019* (2013.01); *A61C 13/275* (2013.01)

(58) Field of Classification Search
CPC ............ A61C 13/0004; A61C 13/0019; A61C 13/275; A61C 13/10; A61C 1/082
(Continued)

(56) References Cited

U.S. PATENT DOCUMENTS 8,506,299 B2 * 8/2013 Gartner ............... A61C 13/0004
433/218
9,295,534 B2 * 3/2016 Ruppert ............... A61C 13/10
(Continued)

FOREIGN PATENT DOCUMENTS

DE       10304757 B4    7/2005
DE    102009056752 A1   6/2011
(Continued)

OTHER PUBLICATIONS

Extended European Search Report in EP Application No. 20150234.1 dated May 4, 2020, 6 pages.

*Primary Examiner* — Matthew M Nelson
(74) *Attorney, Agent, or Firm* — MARSHALL, GERSTEIN & BORUN LLP (57) ABSTRACT

A method for producing a guide rail having the steps of:
 (A) generating or providing a virtual 3D model of a dental prosthesis with at least one virtual model of a machined prosthetic tooth to be arranged in a prosthesis base;
 (B) calculating a volume to be removed from a prefabricated prosthetic tooth;
 (C) generating a virtual model of a guide rail which is fixed to a mount for fastening the prefabricated prosthetic tooth such that the guide rail enables guidance of a milling head and/or a cutting tool of known dimensions, in such a manner that the volume to be removed from the prefabricated prosthetic tooth is traversed with the milling head; and
 (D) producing a physical guide rail on the basis of the virtual model of the guide rail using a CAM method.

Also disclosed are an apparatus for implementing the method, a method for basally shortening prosthetic teeth, and a method for producing a dental prosthesis with such a method for producing a guide rail. The invention further relates to a guide rail produced with such a method and to a dental prosthesis produced with such a method for producing a dental prosthesis.

24 Claims, 9 Drawing Sheets

(58) Field of Classification Search
USPC ...................................................... 433/201.1
See application file for complete search history.

(56) References Cited

U.S. PATENT DOCUMENTS

| | | | |
|---|---|---|---|
| 9,918,810 B2* | 3/2018 | Funk | A61C 13/09 |
| 2014/0087327 A1* | 3/2014 | Noack | A61C 13/08 |
| | | | 433/50 |
| 2016/0193019 A1* | 7/2016 | Heinz | A61C 13/1016 |
| | | | 433/37 |
| 2017/0367798 A1* | 12/2017 | Sagolla | A61C 13/01 |
| 2018/0110599 A1* | 4/2018 | Woldegergis | B25B 1/241 |
| 2019/0167394 A1* | 6/2019 | Jakson | A61C 13/081 |

FOREIGN PATENT DOCUMENTS

| | | | | |
|---|---|---|---|---|
| EP | 2666438 A2 | 11/2013 | | |
| EP | 2571451 B1 | 3/2014 | | |
| EP | 2742906 A1 | 6/2014 | | |
| WO | WO-2012/155161 A1 | 11/2012 | | |
| WO | WO-2013/124452 A1 | 8/2013 | | |
| WO | WO-2013124452 A1 * | 8/2013 | ......... A61C 13/0004 |
| WO | WO-2015/134633 A1 | 9/2015 | | |
| WO | WO-2015134633 A1 * | 9/2015 | ............. A61B 34/10 |
| WO | WO-2016/073053 A1 | 5/2016 | | |
| WO | WO-2016073053 A1 * | 5/2016 | ........... A61B 5/1073 |
| WO | WO-2016/091762 A1 | 6/2016 | | |
| WO | WO-2016/110392 A1 | 7/2016 | | |
| WO | WO-2016/169921 A1 | 10/2016 | | |
| WO | WO-2016/176767 A1 | 11/2016 | | |
| WO | WO-2016176767 A1 * | 11/2016 | | |
| WO | WO-2017/005905 A1 | 1/2017 | | |

* cited by examiner

METHOD FOR PRODUCING A GUIDE RAIL FOR MACHINING PROSTHETIC TEETH

BACKGROUND OF THE INVENTION

Field of the Invention

The invention relates to a method for producing a guide rail which is provided for guiding a mobile milling head during the machining of prefabricated prosthetic teeth. The invention also relates to an apparatus for implementing the method and to a method for basally shortening prosthetic teeth for producing a dental prosthesis and to a method for producing a dental prosthesis with such a method for producing a guide rail. The invention further relates to a guide rail for guiding a mobile milling head during the machining of prefabricated prosthetic teeth, produced using such a method for producing a guide rail, and a dental prosthesis produced with such a method for producing a dental prosthesis.

Related Technology

In addition to craft skills, digital manufacturing methods are becoming increasingly significant in the dental sector. Dental prostheses and other dental moldings, such as for example crowns, bridges and 3-dimensional models of a patient's oral cavity, have for some years been produced by means of Computer-Aided Manufacturing/Computer-Aided Design (CAD/CAM) technologies using subtractive milling methods.

Furthermore, generative CAM methods such as stereolithography and digital light processing (DLP) have been becoming increasingly significant for polymer-based dental products, such as for example for temporary dental appliances, prostheses, maxillary orthopedic appliances, occlusal splints, drilling jigs or dental models.

There are methods, for example the methods known from DE 10 2009 056 752 A1 or WO 2013/124 452 A1, in which a partial or full dental prosthesis is waxed up digitally and produced by means of CAD/CAM methods. Patent DE 103 04 757 B4 discloses a method for producing dental prostheses in which the teeth are virtually waxed-up in a virtual model and a prosthesis base is produced on the basis of the virtual model. EP 2 742 906 A1 discloses a method in which a dental arch is connected to an impression composition, wherein the impression composition is held in an individualized impression tray and contains an impression of the situation in the patient's oral cavity. The surface of the mold with the dental arch is digitized and then a virtual model of the dental arch is computationally positioned and oriented with the best possible fit in the virtual model of the prosthesis base. WO 2016/091 762 A1 discloses a method for producing a dental prosthesis, in which a jig is produced with which a plurality of prosthetic teeth may be fastened in the desired location and orientation relative to one another on a prosthesis base. Patent DE 103 04 757 B4 discloses a method for producing dental prostheses in which the teeth are virtually waxed-up in a virtual model and a prosthesis base is produced on the basis of the virtual model. WO 2016/110 392 A1 discloses a method for producing a dental prosthesis, in which a plastically deformable connecting means is introduced into dental alveoli of a prosthesis base in order to enable manual correction of the orientation of the prosthetic teeth in the prosthesis base.

There are technical approaches to separating the data of the prosthesis base and of the teeth in the production of removable dental prostheses, such as full and partial dental prostheses, which were produced by means of digital data using a CAD design. The prosthesis base may in this case be produced by a generative or also a subtractive manufacturing method. Suitable prosthetic teeth are prefabricated plastic teeth or also individually produced prosthetic teeth or dental arches made from the same starting materials. In any case, dental alveoli for accommodating these prosthetic teeth must be provided in the prosthesis base into which the prosthetic teeth or the dental arches are then fastened, for example by adhesive bonding, in a subsequent manual manufacturing step.

The process of digitally manufacturing full prostheses (full dentures) or partial prostheses entails shortening the prefabricated prosthetic teeth basally in order to adapt tooth height to the patient's jaw or the situation in the patient's oral cavity.

Methods for this purpose are known from EP 2 571 451 B1 and EP 2 666 438 A2, in which prefabricated prosthetic teeth are embedded in a wax mount and then milled away basally by means of CAM methods. The prosthetic teeth shortened in this manner are removed from the wax and then inserted in a prosthesis base and adhesively bonded therein in order to produce a dental prosthesis. One drawback of this is that the prosthetic teeth must have wax residues removed and be cleaned before they can be inserted into the prosthesis base. It is necessary to shorten the prosthetic teeth basally in order to adapt tooth height to the patient's jaw, i.e. to tailor the occlusal height of the dental prosthesis to the patient's requirements. CAM milling machines are moreover expensive and complex and not available in every dental laboratory.

WO 2017/005 905 A1 proposes machining a set of prosthetic teeth which are fixed in a shrink film. The shrink film here has to be removed with the CAM apparatus in those regions in which the prosthetic teeth are to be machined Achieving precise machining of the prosthetic teeth when using this fixing method is difficult.

US 2019/0 167 394 A1 discloses a jig in which the prosthetic teeth to be basally machined are covered at those locations which are not to be machined and thus shortened. Using the jig, the exposed regions of the basal ends of the prosthetic teeth can be straightforwardly milled away. One drawback of this is that the final result largely depends on the craft skills of the machinist in order to enable maximally accurate basal shortening of the prosthetic teeth. The width of the bond gap between the shortened prosthetic teeth and the alveoli in the prosthesis base may vary as a result, such that it is not straightforwardly possible to use a defined quantity of an adhesive for adhesively bonding the prosthetic teeth into the prosthesis base. Due to the manual machining, it is not possible to standardize, let alone automate, the machining method stated therein.

SUMMARY

It is thus the object of the invention to overcome the disadvantages of the prior art. In particular, the intention is to identify a way of further simplifying the method and a way of standardizing the method. The intention is additionally to make use of the digital design data for the dental prosthesis, such as CAD data, which are in any event required and usually already available for modern methods. These data should permit maximally accurate shortening of the prosthetic teeth and thus the production of a dental prosthesis which matches the virtual model as accurately as possible. The method should be suitable and provided for machining prefabricated prosthetic teeth and or include the machining. The method should also be performable by unskilled personnel or fully automatically to as great an extent as possible.

The objects of the invention are achieved by a method for producing a guide rail which is provided for guiding a mobile milling head or cutting tool during the machining of prefabricated prosthetic teeth, wherein the method is characterized by the following steps:

(A) generating or providing a virtual 3D model of a dental prosthesis with a virtual model of a prosthesis base as a gum imitation and with at least one virtual model of at least one machined prosthetic tooth to be arranged in the prosthesis base to reproduce at least one tooth;

(B) calculating a volume to be removed from at least one prefabricated prosthetic tooth by comparing the at least one virtual model of the at least one machined prosthetic tooth with at least one virtual model of the at least one prefabricated prosthetic tooth using a CAD method;

(C) generating a virtual model of a guide rail using a CAD method, which guide rail is fixed or fixable to a mount for fastening the at least one prefabricated prosthetic tooth, wherein the guide rail is modeled such that (a) the mount is positioned relative to the guide rail and (b) the at least one prefabricated prosthetic tooth is fastened in the mount in an orientation whereby the guide rail enables guidance of at least one milling head and/or at least one cutting tool of known dimensions in such a manner that the volume to be removed from the at least one prefabricated prosthetic tooth is traversed with the at least one milling head and/or the volume to be removed from the at least one prefabricated prosthetic tooth is cut away with the at least one cutting tool; and (D) producing a physical guide rail on the basis of the virtual model of the guide rail using a CAM method.

The guide rail is preferably modeled and the mount positioned relative to the guide rail and the at least one prefabricated prosthetic tooth fastened in the mount in an orientation such that the guide rail enables guidance of at least one milling head of known dimensions or at least one cutting tool of known dimensions in such manner that the volume to be removed from the at least one prefabricated prosthetic tooth is completely traversed or detached, particularly preferably is completely milled or cut away, with the at least one milling head or the at least one cutting tool.

Production of the physical guide rail preferably proceeds in step (D) together with the production of the mount using a CAM method.

It is possible for the purposes of the present invention for the mount to completely embed the at least one prefabricated prosthetic tooth to be machined. In this case, parts of the mount have to be milled away together with the at least one prefabricated prosthetic tooth. It is, however, preferred according to the invention for there to be no need to machine or mill or cut away the mount with the at least one prefabricated prosthetic tooth and the mount is therefore shaped such that the volume to be removed from the at least one prefabricated prosthetic tooth is exposed.

It may be provided that the mount fastens the at least one prefabricated prosthetic tooth such that the at least one prefabricated prosthetic tooth does not move towards the mount as a result of the forces arising during milling or cutting.

If a plurality of milling heads of different diameters than the at least one milling head are used, the volume to be removed from the at least one prefabricated prosthetic tooth is completely traversed only with the milling head with the largest diameter. The milling heads with a smaller diameter accordingly traverse only a sub-region of the volume to be removed from the at least one prefabricated prosthetic tooth or even no region at all of the volume to be removed from the at least one prefabricated prosthetic tooth. Similarly, it is also conceivable for different milling heads with axial lengths which differ from one another to be used. Milling sub-regions of the at least one prefabricated prosthetic tooth has the advantage that the temporal duration of milling and the forces arising during milling are limited.

In methods according to the invention, it may also be provided that the guide rail enables or compels guidance of the at least one milling head and/or at least one cutting tool along a line or along a spatial area.

In this way, the subsequent milling or cutting is unambiguously guided and hence particularly simple to implement. Furthermore, possible sources of error are thereby prevented.

It may moreover be provided that in step (C) a virtual model of the mount is generated using a CAD method and in step (D) a physical mount is produced on the basis of the virtual model of the mount using a CAM method.

This makes use of the possibility of influencing the location and position of the least one prefabricated prosthetic tooth by the modeling of the mount.

The mount is preferably of two- or multipart construction so that the at least one prefabricated prosthetic tooth can be straightforwardly fastened in the mount.

According to the invention, the mount is preferably to be additively manufactured or to be manufactured by an additive manufacturing method. Suitable additive manufacturing methods are in particular digital light processing (DLP) and 3D printing methods in general.

The guide rail is as far as possible to be produced automatically by means of an additive or subtractive method, wherein additive methods are preferred according to the invention.

It may also be provided that the mount is a prefabricated standard component and that only the guide rails are individually produced. The mount may then be provided for single use. To this end, the mount may always be jointly milled.

It may preferably also be provided that the mount is modeled such that the volume to be removed of the at least one prefabricated prosthetic tooth projects out from the mount, preferably only the volume to be removed of the at least one prefabricated prosthetic tooth projects out from the mount and particularly preferably the mount abuts the at least one prefabricated prosthetic tooth at all adjoining surfaces of the volume to be removed.

As a consequence, the mount need not be milled away together with the prosthetic tooth. Furthermore the at least one prefabricated prosthetic tooth can be held particularly stably in the mount so that the forces arising during milling can be effectively absorbed without the at least one prefabricated prosthetic tooth moving in the mount.

A preferred further development of the method according to the invention may provide that in step (C) fastening elements are modeled on the virtual model of the guide rail or on a virtual model of the mount or on the virtual models of the guide rail and the mount by means of which the guide rail and the mount are fixable relative to one another in a unique position and orientation, wherein after step (D) the physical guide rail and the physical mount are preferably fixed to one another via the fastening elements.

In this way, the position and orientation of the mount against the guide rail can be simply defined, namely by the placement of fastening elements, and simultaneously used for the purpose of traversing the volume to be removed from the at least one prefabricated prosthetic tooth by a simple movement of the at least one milling head and/or at least one cutting tool.

It may furthermore be provided that in step (B) at least one boundary line which delimits the volume to be removed is calculated on the surface of the at least one virtual model of the prefabricated prosthetic tooth.

In this way, the volume to be removed may be simply delimited and the method implemented in computationally resource-efficient manner by making use of the boundary line for calculating the virtual model of the guide rail and optionally of the virtual model of the mount.

It may here be provided that in step (C) at least one virtual model of at least one jig is generated as the mount of the guide rail, wherein the at least one jig has an inner surface, wherein the inner surface corresponds in places to a negative mold of the at least one prefabricated prosthetic tooth, wherein the at least one jig has at least one opening in the at least one virtual model, which opening is delimited by the at least one boundary line, and wherein the surfaces of the at least one virtual model of the at least one jig are shaped such that the at least one virtual model of the at least one prefabricated prosthetic tooth is insertable without overlap into the at least one virtual model of the at least one jig.

In this way, the method produces a stable mount which is suitable for robustly fastening the at least one prefabricated prosthetic tooth during milling and/or cutting. In addition, in this way the position and orientation of the at least one prefabricated prosthetic tooth against the guide rail can be defined at will and the guide rail accordingly simply built up, so simplifying guidance of the at least one milling head and/or at least one cutting tool in the guide rail.

It may furthermore be provided that in step D) at least one physical jig is produced as a mount of the guide rail on the basis of the at least one virtual model of the at least one jig using a CAM method.

In this way, the method is completed and further automated.

A preferred further development of the method according to the invention may provide that the guide rail is modeled such that the orientation of a pivot shaft of the at least one milling head and/or a location of a cutting edge of the at least one cutting tool does not change during guidance in the guide rail and the pivot shaft or the location of the cutting edge is only translationally displaced, wherein the mount is preferably modeled to fit and/or the fastening of the mount on the guide rail is modeled to fit.

The absence of any change in the orientation of the pivot shaft of the at least one milling head means that the direction of the axial vector of the rotational motion in space does not change. The pivot shaft accordingly does not tilt. The same applies mutatis mutandis to the location of the cutting edge of the at least one cutting tool.

This ensures that the at least one milling head and/or the at least one cutting tool is particularly simple to guide in the guide rail.

It may further also be provided that the virtual model of the guide rail is produced with two mutually opposing guide rail parts, wherein the mount for fastening the at least one prefabricated prosthetic tooth is arranged between the guide rail parts and the at least one milling head and/or the at least one cutting tool is guided between the guide rail parts, wherein the two guide rail parts preferably have identical guideways for guiding the at least one milling head and/or the at least one cutting tool.

In this way, the at least one milling head and/or the at least one cutting tool can be particularly stably and simply guided against the at least one prefabricated prosthetic tooth.

Preferably, it may be further provided that the two guide rail parts are individually detachably fastened to the mount and/or to one another or are detachably fastenable to the mount and/or to one another. The two guide rail parts may likewise again be of multipart construction, wherein the parts of the guide rail parts are fastenable to one another and/or to the mount.

Preferably, it may be further provided that the mount is a multipart mount in which the at least one prefabricated prosthetic tooth is detachably fastenable, wherein the parts of the multipart mount are preferably detachably fastenable to one another.

In this way, the at least one prefabricated prosthetic tooth may be readily machined and, after machining, easily removed and used for manufacturing the dental prosthesis.

It may also be provided that the at least one virtual model of at least the machined prosthetic tooth to be arranged in the prosthesis base is generated in step A) such that the basal surface of the at least one virtual model of the at least one machined prosthetic tooth can be shaped by at least one milling head of a known rotationally symmetrical shape which rotates about the pivot shaft thereof and is guided along a line.

In this way, the virtual model of the at least one prosthetic tooth is adapted to the usable milling heads. The result in the form of the machined prosthetic tooth may consequently be optimized to the result achievable with the milling heads. The operator may here be automatically informed (for example on a display device such as a screen) which milling head should be used as the final milling head for basally machining the at least one prefabricated prosthetic tooth or which milling heads should be used in what sequence for basally machining the at least one prefabricated prosthetic tooth. Alternatively, in the event of complete automation, the desired final milling head may also be selected and chucked by machine.

The external rotationally symmetrical shape of the milling head determines the maximum radii of curvature which can be produced with the milling head and the milling face producible with the milling head. A relatively large selection of different milling heads means that the basal surface of the at least one machined prosthetic tooth may be differently shaped or more finely textured.

Similar considerations also apply to the at least one cutting tool.

The objects addressed by the invention are also achieved by a method for basally shortening prosthetic teeth for producing a dental prosthesis including a method according to the invention for producing a guide rail, wherein after step D) at least one prefabricated prosthetic tooth which is or has been fastened in the mount is basally machined with the at least one milling head and/or the at least one cutting tool, wherein the at least one milling head and/or the at least one cutting tool is guided with the physical guide rail, wherein in so doing the volume to be removed of the at least one prefabricated prosthetic tooth is milled away, wherein the at least one milling head and/or the at least one cutting tool is preferably guided manually in the physical guide rail.

In this way, the advantages obtained for the guide rail and the mount are obtained for the method for basally shortening prosthetic teeth.

It may be provided that a plurality of milling heads with different milling head diameters are used in the method, wherein the milling heads of increasing diameter are guided in succession in the physical guide rail and/or a plurality of cutting tools with different cutting planes are used in the method, wherein the guided cutting edges have cutting planes which cut successively progressively deeper into the basal sides of the prosthetic teeth.

In this way, the at least one prefabricated prosthetic tooth may be removed layer-by-layer, such that lower forces act on the milling heads, the cutting edges and the at least one prefabricated prosthetic tooth.

The objects of the present invention are furthermore achieved by a method for producing a dental prosthesis including a method according to the invention for basally shortening prosthetic teeth, wherein, after basal shortening of the at least one prefabricated prosthetic tooth, the at least one machined prosthetic tooth is fastened, in particular adhesively bonded, in a prosthesis base as a gum imitation.

In this way, the advantages obtained from the simplified basal machining of the prosthetic teeth are used for producing a dental prosthesis.

It may be provided that the prosthesis base is produced by means of a CAM method on the basis of the virtual model of the prosthesis base according to step A).

In this way, it is ensured that the at least one machined prosthetic tooth is shaped to fit the prosthesis base and the modeled dental prosthesis is thus obtained.

The objects addressed by the present invention problem are also achieved by an apparatus for implementing a method according to the invention, wherein the apparatus has a calculation module for modeling a virtual shape of the guide rail from the data of a volume to be removed from prefabricated prosthetic teeth according to method step C) and preferably comprises a CAM apparatus, in particular a 3D printer, for producing the guide rail or is connected or connectable to such a CAM apparatus via an interface of the apparatus for implementing method step D).

The apparatus here preferably performs the method steps described with the method according to the invention.

The objects addressed by the present invention are also achieved by a guide rail for guiding a mobile milling head and/or a mobile cutting tool during the machining of prefabricated prosthetic teeth produced with a method according to the invention for producing a guide rail.

The guide rail then has the advantages stated for the method.

It may here be provided that the guide rail is firmly connected to a mount or is connectable in a specific position, such that a volume to be removed of the at least one prefabricated prosthetic tooth on the basal side thereof can be removed with at least one milling head and/or cutting tool guided in the guide rail.

In this way, the guide rail or the apparatus with the guide rail is further completed.

The guide rail and/or the mount may be of two- or multipart construction. The parts of the guide rail and/or the mount may furthermore be fastenable to one another.

Finally, the objects addressed by the present invention are also achieved by a dental prosthesis produced with a method according to the invention, in which the at least one machined prosthetic tooth is connected to the prosthesis base via a basal surface which is machined with at least one milling head and/or cutting tool guided in a guide rail.

In this way, the advantages stated for the method are obtained for the dental prosthesis produced in this manner.

The prosthetic teeth basally machined with the method according to the invention may be distinguished from prosthetic teeth basally machined with a computer-controlled milling machine or by freehand manual operation in that the milling or cutting traces of prosthetic teeth machined with the method according to the invention are guided along a line or area. This is because the machined surfaces receive typical grinding patterns and grooves which differ from the varying angles conventionally obtained with freehand machining or the layer-by-layer and grid-like machining of computer-controlled milling.

The invention is based on the surprising recognition that individualized guide rails enable successful basal shortening, specifically by a volume of defined dimensions to be removed which is calculated on the basis of a computer model, of fixed prefabricated prosthetic teeth with a milling head guided by the guide rail and/or a cutting tool guided by the guide rail, wherein the virtual models of the prefabricated prosthetic teeth to be shortened are used to calculate the shape of the guide rail. The virtual models of the prefabricated prosthetic teeth to be shortened are ideally in any event available or may be calculated in the course of the method according to the invention. The method according to the invention gives rise to an individualized guide rail which is directly usable for manually shortening the prefabricated prosthetic teeth with the assistance of the guide rail. Shortening may proceed straightforwardly by means of at least one milling head and/or cutting tool guided manually in the guide rail.

The described invention makes it possible to shorten the prosthetic teeth without using a milling machine by means of an additively manufactured guide rail and a dental handpiece with a milling head for subtractively machining the prosthetic teeth.

As in the prior art, a digital wax-up and modeling of a prosthesis base is carried out with dental CAD software. This process involves locating the prefabricated prosthetic teeth to be basally shortened and creating a CAD model of the shortened prosthetic tooth. In the next step, the CAD software creates an apparatus for holding the prosthetic teeth which permits insertion of the prefabricated prosthetic teeth. The regions to be removed project out from the mount. Furthermore, a guide rail individually adapted to the regions of the prefabricated prosthetic teeth to be milled away for guiding a milling head of known dimensions or a cutting tool of known dimensions is produced which enables guidance of the milling head or cutting tool along a guideway over the mount and which furthermore enables the performance of more accurate machining of the prefabricated prosthetic teeth fixed in the mount using a specific tool for a dental handpiece. The guide rail is preferably of multipart, divisible construction and may be fastened to the mount in a defined position.

The prosthetic teeth are shortened by chucking the milling head into the dental handpiece and introducing it into the guide rail over the mount. The prefabricated prosthetic teeth are shortened by displacing the milling head within the guide rail.

The mount and the guide rail are additively manufactured, for example by 3D printing. It is possible for the mount and the guide rail to be produced together with the prosthesis base.

The regions jutting out from the mount are removed with a dental handpiece with the milling head by passing a manually operable milling machine, such as for example a Dremel rotary tool, with the guide rails over the basal ends, which protrude from the mount, of the mounted prefabricated prosthetic teeth. The mount is preferably multipart and divisible.

Should major basal shortening of the prefabricated prosthetic teeth be necessary, it is possible, by means of milling heads with different diameters, to limit material removal per application of a milling head in order in this way to prevent excessive machining in an individual step and thus exposing the prosthetic teeth to excessive mechanical loads.

The present invention permits insertion of esthetically pleasing fabricated teeth into additively manufactured prosthesis bases, instead of requiring the use of additively manufactured monochrome prosthetic teeth. At the same time, basal shortening of the fabricated teeth in accordance with a CAD model can be carried out without a laboratory milling machine. Cost savings are furthermore achieved since normal prefabricated prosthetic teeth can be shortened, wherein there is no need for fabricated teeth cast and positioned in wax.

BRIEF DESCRIPTION OF THE DRAWINGS

Exemplary embodiments of the invention are explained below with reference to eight schematic figures and a flow chart but without in any way limiting the invention. In the figures.

DETAILED DESCRIPTION

In the figures, the same reference signs are in some cases used for the same parts in different embodiments in order to improve the readability and comparability of the exemplary embodiments.

Figure 1:
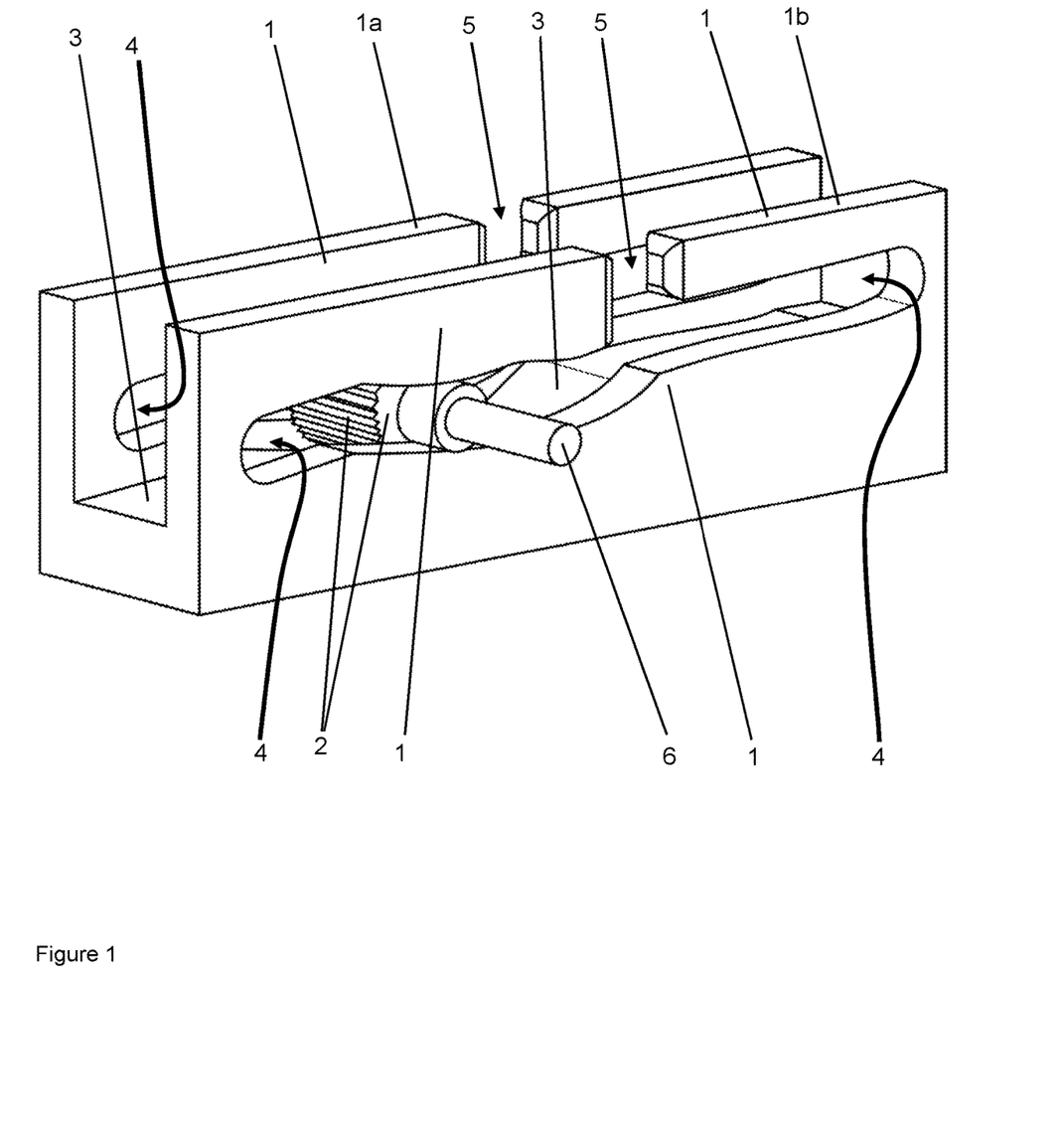
FIG. 1 shows a schematic perspective view of a guide rail according to the invention with inserted milling head, wherein the guide rail was produced with a method according to the invention.
Figure 2:
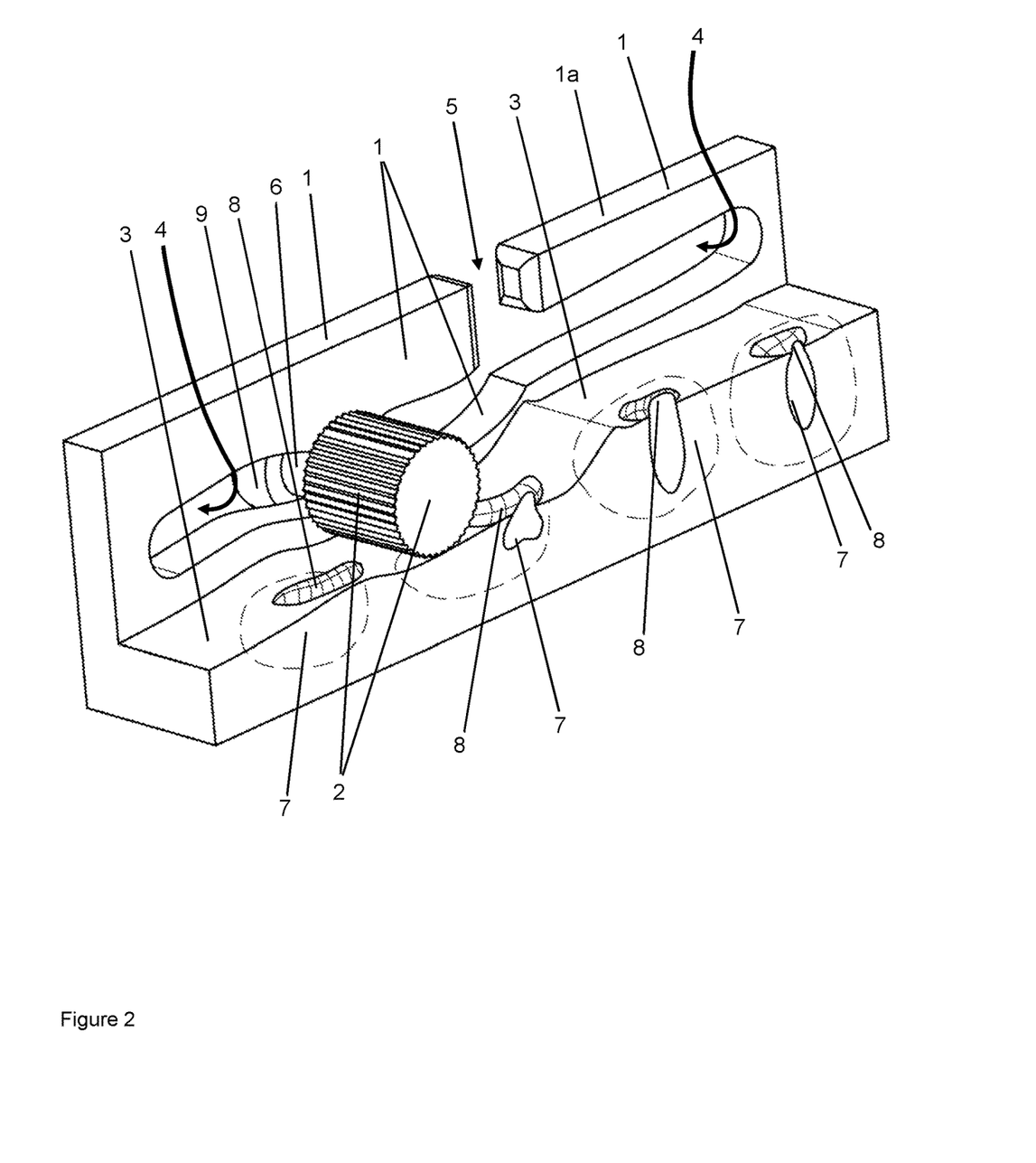
FIG. 2 shows a schematic perspective longitudinal cross-section through the guide rail according to FIG. 1 with inserted prefabricated prosthetic teeth.
Figure 3:
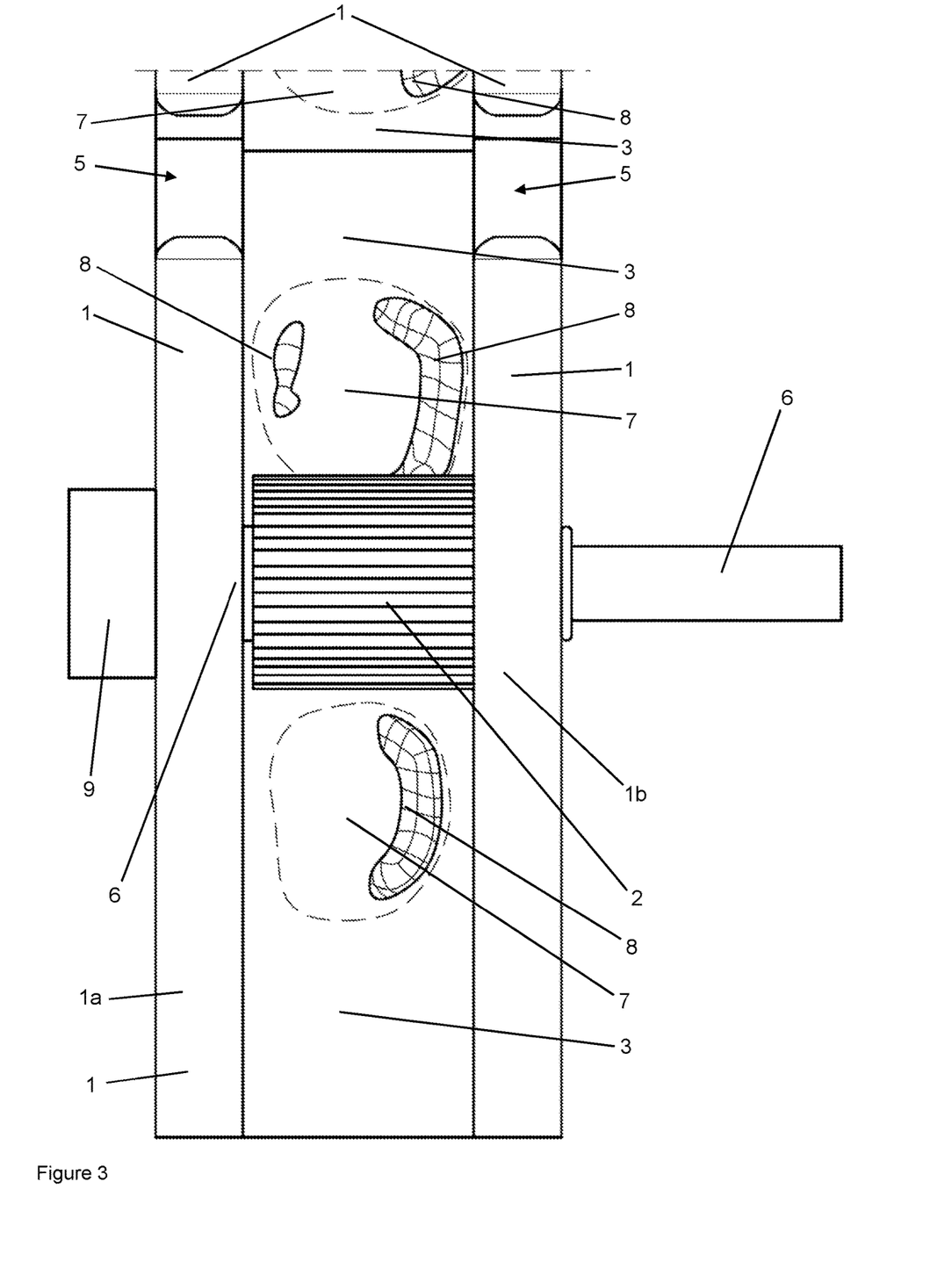
FIG. 3 shows a schematic plan view of a portion of the guide rail according to FIGS. 1 and 2.

FIGS. 1 to 3 show different views of a guide rail 1 produced with a method according to the invention. The purpose of the guide rail 1 is to guide a milling head 2. The guide rail 1 may be of two-part or multipart construction. For example, the guide rail 1 may have two lateral guide rail parts 1a, 1b which are fastened to a mount 3 which is arranged between the guide rail parts 1a, 1b. The guide rail parts 1a, 1b may be manufactured individually or also together with one another or also together with the mount 3, for example using a generative 3D printing method.

Guideways 4 as slots in the guide rail 1 may be arranged in both guide rail parts 1a, 1b. The guideways 4 have the same shape in FIGS. 1 to 3, such that the milling head 2 is guided therebetween without any tilting of the pivot shaft of the milling head 2. It is, however, also possible to configure the guideways 4 differently and with a modification of the inclination of the pivot shaft of the milling head 2 along the guideways 4.

In order to enable insertion of the tool, i.e. the milling head 2, between the two guide rail parts 1a, 1b, a slot 5 may be provided in each of the guide rail parts 1a, 1b, which slot may be connected to the guideways 4.

The milling head 2 may be driven via a shaft 6 which may be connected to a motor (not shown). The milling head 2 with the shaft 6 and the motor may be part of a conventional Dremel or comparable rotary tool. Drives for drills, as are available in dental practices or dental laboratories, can be used for this purpose without any problem.

Prefabricated prosthetic teeth 7 may be fastened in the mount 3. The mount 3 for fixing the prefabricated prosthetic teeth 7 preferably largely encloses the latter. It may, however, preferably be provided that the volume 8 to be removed basally from the prefabricated prosthetic teeth 7 projects out from the mount 3, as is visible in FIGS. 1 to 5. The mount 3 is preferably of multipart construction, such that the individual prosthetic teeth 7 can be readily inserted and also removed again after machining. The mount 3 can also be cast by embedding the prefabricated prosthetic teeth 7 in a wax, so resulting in a one-piece mount 3.

The guide rail 1 and guideways 4 are shaped and the mount 3 positioned relative to the guideways 4 such that a milling head 2 of known dimensions is capable of traversing and thus removing precisely the volume 8 to be removed from prefabricated prosthetic teeth 7. This may be achieved by making use of data which were used for modeling the dental prosthesis 16, 18 (see FIG. 8) to be produced when designing the guide rail 1 with the guideways 4 and optionally when designing the mount 3. These data namely include the information as to how the prefabricated prosthetic teeth 7 have to be shortened for them to be correctly positioned and located in the prosthesis base 26, 28 (see FIG. 8), such that the desired occlusion, the desired aesthetic appearance and the desired function of the dental prosthesis 16, 18 is achieved in the patient. Due to the guide rail 1 embodied in this manner, the milling head 2 may be guided simply over the basal sides of the prefabricated prosthetic teeth 7 such that precisely the volume 8 to be removed is removed from the prefabricated prosthetic teeth 7.

In order to facilitate guidance of the milling head 2, a disk 9 may be arranged on an extension of the milling head 2 to prevent the milling head from slipping out of the guideway 4. For this purpose, the disk 9 merely needs to have a larger diameter than the guideway 4.

Figure 4:
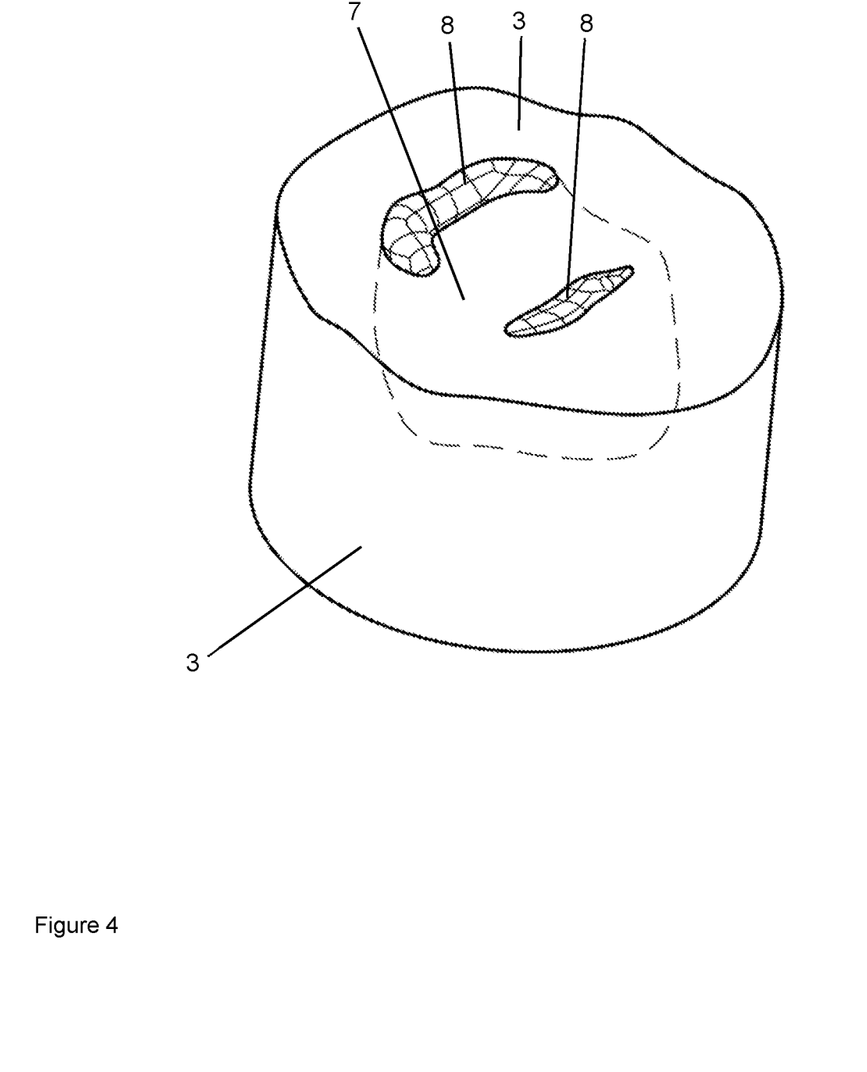
FIG. 4 shows a prefabricated prosthetic tooth in a mount.
Figure 5:
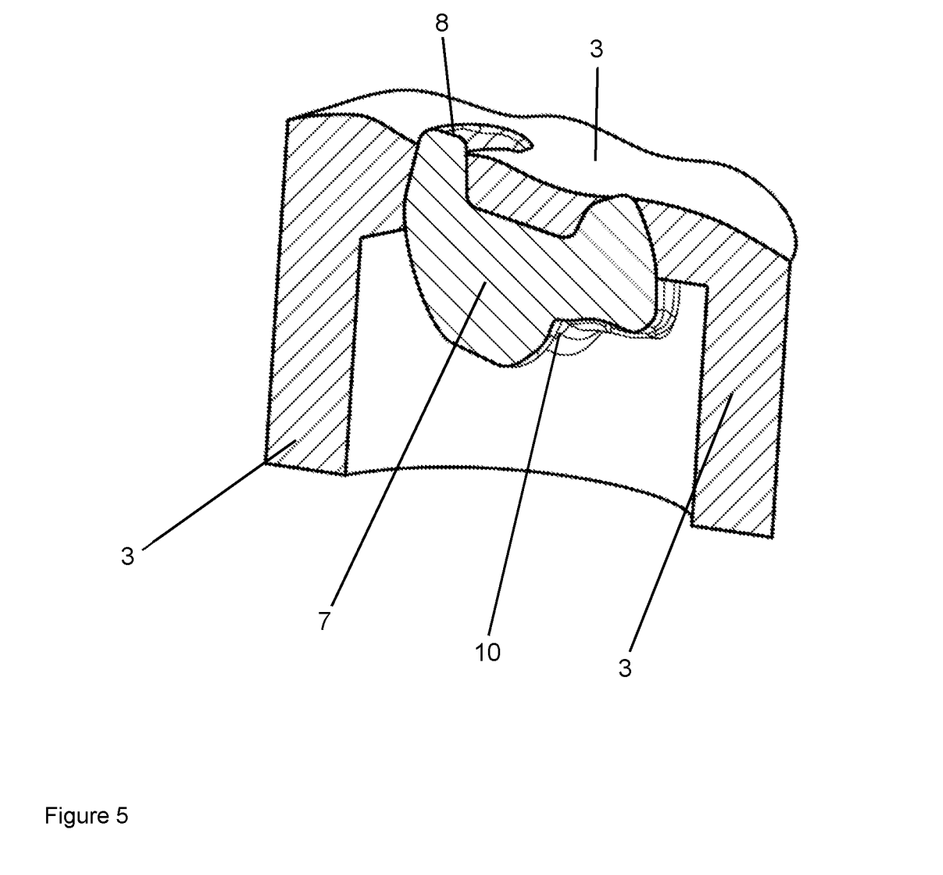
FIG. 5 shows a schematic perspective cross-sectional view through the prosthetic tooth and the mount according to FIG. 4.
Figure 6:
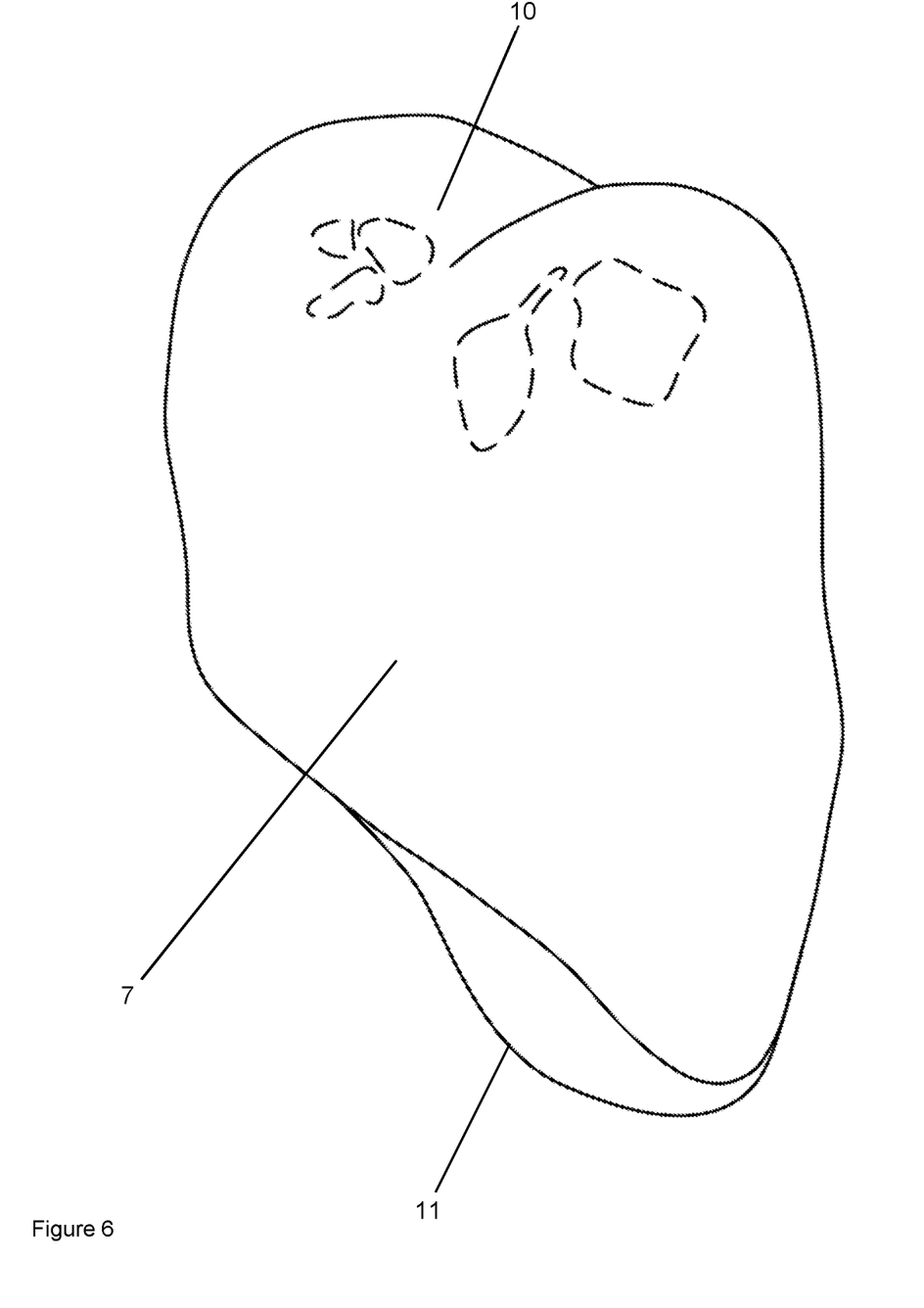
FIG. 6 shows a prefabricated prosthetic tooth.

FIGS. 4 and 5 show a portion of a mount 3 which holds a prefabricated prosthetic tooth 7. FIG. 6 shows a prefabricated prosthetic tooth 7 before machining. A coronal side 10 of the prefabricated prosthetic tooth 7 points into the interior of the mount 3. The prefabricated prosthetic tooth 7 may be embedded in the mount 3 such that precisely the volume 8 to be removed juts out from the basal side 11 thereof. The basal side 11 of the prefabricated prosthetic tooth 7 is arranged opposite the coronal side 10 of the prefabricated prosthetic tooth 7. The mount 3 may be divisible for example along the cross-sectional area shown in FIG. 5 in order to permit convenient insertion of the prefabricated prosthetic tooth 7 into the mount 3 as well as convenient removal after subtractive machining. The prefabricated prosthetic tooth 7 is held stably in the mount 3 during the subtractive machining.

Figure 7:
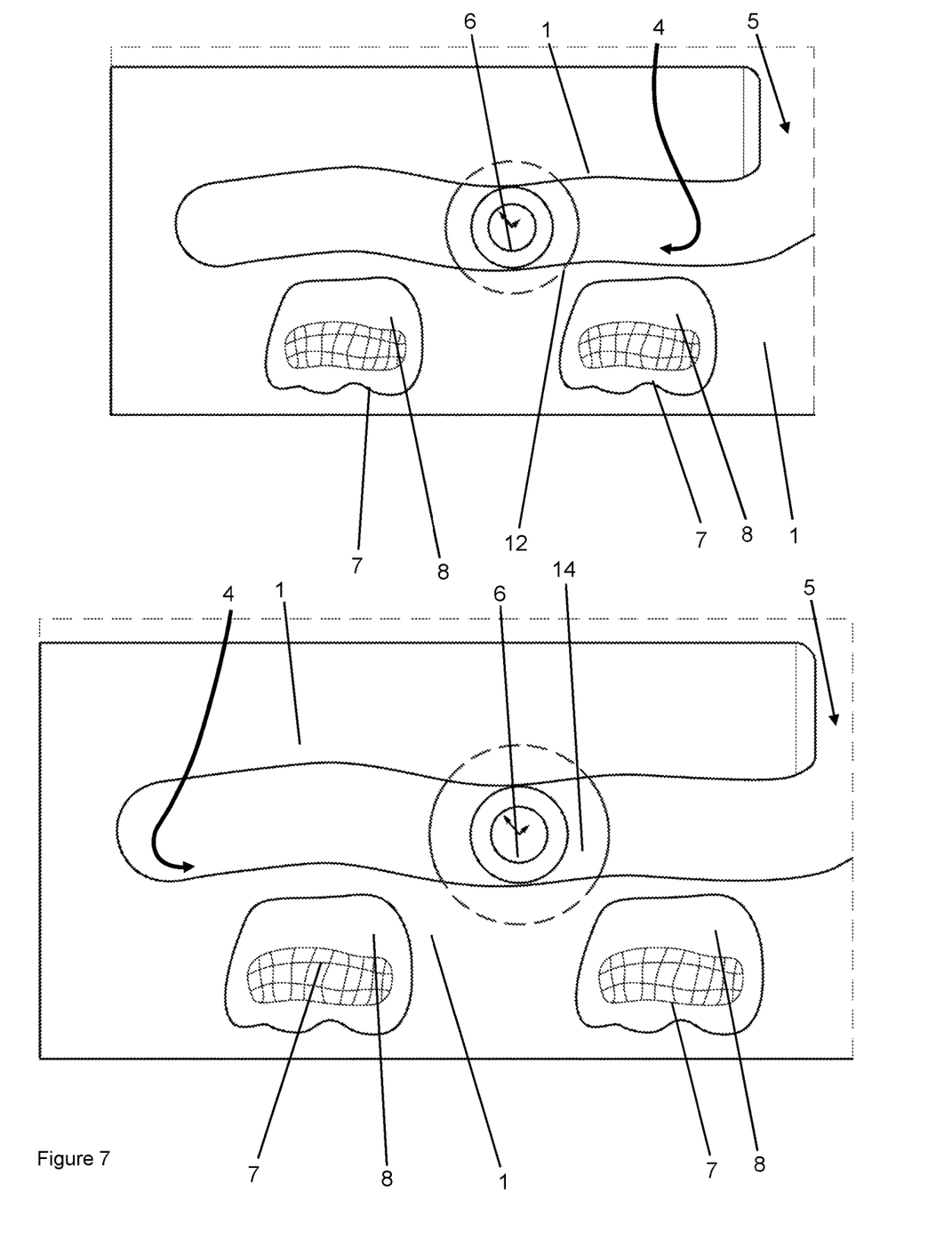
FIG. 7 shows two schematic side views of a guide rail produced with a method according to the invention, in which milling heads of different diameters are guided for implementing a method according to the invention.

FIG. 7 shows two schematic side views of portions of a guide rail 1 produced with a method according to the invention, in which milling heads 12, 14 with different diameters may be guided for implementing a method according to the invention. The guide rail 1 has a guideway 4 in which the milling heads 12, 14 may be guided over prefabricated prosthetic teeth 7. The guide rail 1 is of transparent construction so that the location of the prefabricated prosthetic teeth 7 is identifiable. In order to permit introduction of the milling heads 12, 14 into the guide rail 1, the guideway 4 may be accessed from the outside via a slot 5. The milling heads 12, 14 may be interchangeably fastened or fastenable to a driven pivot shaft 6.

A milling head 12 with a small diameter is used first (see FIG. 7 top). This milling head 12 is guided along the guideway 4 over the prefabricated prosthetic teeth 7. A basal portion of a volume 8 to be removed from the prefabricated prosthetic teeth 7 is removed. A milling head 14 with a larger diameter is then used (see FIG. 7 bottom). This milling head 14 is likewise guided along the guideway 4 over the prefabricated prosthetic teeth 7. In the process, the remaining volume 8 to be removed from the prefabricated prosthetic teeth 7 is removed. Theoretically, it might also be possible to use only the milling head 14 with the larger diameter. Dividing the method in two is intended to prevent the resistance against the milling head 12, 14 from becoming too large and the prefabricated prosthetic teeth 7 from being exposed to excessive mechanical loads.

Since the guide rail 1 can be produced with a generative method, such as for example a 3D printer, and the prefabricated prosthetic teeth 7 can be basally shortened with a manually held Dremel rotary tool or milling head 2 guided manually in the guide rail 1 or another cutting tool (not shown) by guidance in the guide rail, a computer-controlled milling machine is not required for implementing the method according to the invention. In this way, a 3D printer which may already in any event be available or another available apparatus may be used for generatively manufacturing the guide rail 1 and, if desired, also the mount 2, such that the method according to the invention may be carried out without requiring the purchase of a costly computer-controlled milling machine.

Figure 8:
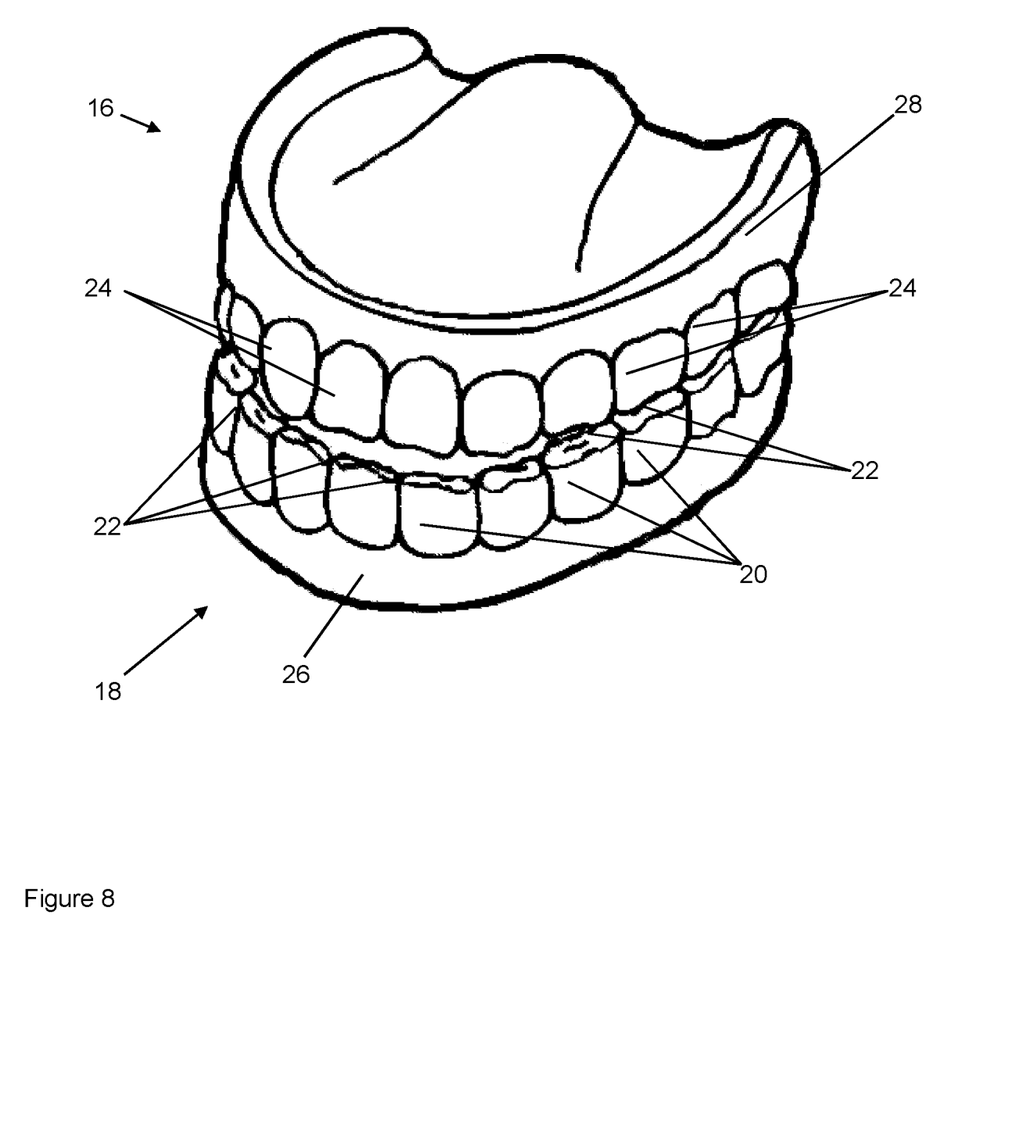
FIG. 8 shows a schematic perspective view of a dental prosthesis according to the invention which was produced with a method according to the invention.

FIG. 8 shows a dental prosthesis 16 for an upper jaw and a dental prosthesis 18 for a lower jaw which were produced with a method according to the invention. The prosthetic teeth 20, 24 inserted into the dental prostheses 16, 18 were to this end basally machined with the assistance of a guide rail 1 as shown in FIGS. 1 to 3 and 7. The coronal side 22 of the prosthetic teeth 20 for the lower jaw is visible in FIG. 8. The basally subtractively machined prosthetic teeth 20 may then be adhesively bonded into a prosthesis base 26 for the lower jaw and the basally subtractively machined prosthetic teeth 24 into a prosthesis base 28 for the upper jaw. The prosthesis bases 26, 28 may be produced with a generative or subtractive CAM method on the basis of an available virtual model generated using a CAD method, such that the prosthesis bases 26, 28 precisely fit the prosthetic teeth 22, 24 machined with the assistance of the guide rail 1.

Figure 9:
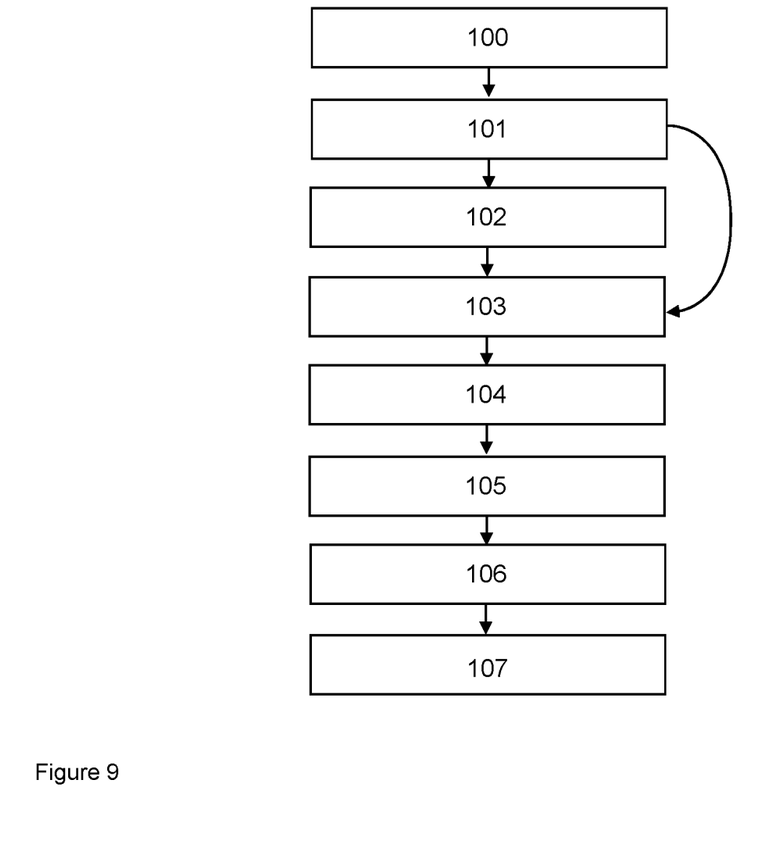
FIG. 9 shows the sequence of a process according to the invention for producing a guide rail for machining prosthetic teeth.

FIG. 9 shows the sequence of a method according to the invention which is explained below with reference to FIGS. 1 to 8.

A first step 100 may involve reading in available CAD data regarding the desired shape of the machined prosthetic teeth 22, 24 or the volume 8 to be removed from the prefabricated prosthetic teeth 7. The data may be stored in an electronic memory. A data interface (not shown), via which the CAD data are read in, may be available for this purpose. Alternatively, the volumes 8 to be removed may also be calculated as part of the method according to the invention.

One or more (also different) virtual shapes of guideways 4 may be calculated from the read in CAD data in a second step 101. A calculation module may be used for this purpose. Account may here be taken in the mount 3 of the orientation(s) and position(s) of the at least one prefabricated prosthetic tooth 7 in relation to the volume 8 to be removed from the respective prefabricated prosthetic tooth 7. The guideway 4 or guideways 4 are here shaped such that a milling head 2, 12, 14 of known diameter or a cutting tool for subtractive machining of prosthetic teeth 7 on guidance in the guide rail 1 is passed over the basal sides of the at least one prefabricated prosthetic tooth 7 in such a manner that the volume 8 to be removed from the at least one prefabricated prosthetic tooth 7 is subtractively removed. The guideway 4 or guideways 4 may be calculated by simulating or precalculating a movement sequence of the milling head 2 relative to the at least one stationary prefabricated prosthetic tooth 7.

In an optional third step 102, a virtual model of the mount 3 may also be calculated similarly to the guide rail 1. The virtual models of the second step 101 and third step 102 are preferably coordinated with one another. It may be provided that the mount 3 to be fastened to the guide rail 1 is modeled such that the pivot shaft of the milling head 2, which is to be guided in the guide rail 1, is not inclined when the milling head 2 is guided along the guideway(s) 4 with the guide rail 1.

The third step 102 or second step 101 may be followed by a fourth step 103 in which the guide rail 1 is produced using a CAM method. A generative CAM method, particularly preferably a 3D printing method, is preferably used as the CAM method. The mount 3 may optionally also be produced in the fourth step 103. A prosthesis base 26, 28 may likewise optionally also be produced in the fourth step 103.

The method according to the invention for producing the guide rail 1 is then complete. The guide rail may then be used in further steps in order to produce a dental prosthesis 16, 18 according to the invention.

In a fifth step 104, the at least one prosthetic tooth 7 is fixed in the mount 3 and the guide rail 1 is fixed to the mount 3.

In a sixth step 105, volume 8 or volumes 8 to be removed from the at least one prefabricated prosthetic tooth 7 are removed by guiding the milling head 2 or milling heads 12, 14 and/or the at least one cutting tool along the guideway 4 over the basal sides 11 of the at least one prefabricated prosthetic tooth 7.

In a seventh step 106, the at least one basally shortened or machined prosthetic tooth is removed from the mount 3 and optionally cleaned.

In an eighth step 107, the at least one machined prosthetic tooth 20, 24 is bonded in a fitting dental alveolus of the prosthesis base 26, 28. The dental prosthesis 16, 18 produced in this manner may then optionally be cleaned.

The features of the invention disclosed in the preceding description, as well as in the claims, figures and exemplary embodiments, may be essential both individually and in any combination for realizing the invention in its various embodiments.

LIST OF REFERENCE NUMERALS

1 Guide rail
1*a*, 1*b* Guide rail part

2 Milling head
3 Mount
4 Guideway
5 Slot
6 Shaft
7 Prefabricated prosthetic tooth
8 Volume to be removed
9 Disk
10 Coronal side
11 Basal side
12 Small-diameter milling head
14 Large-diameter milling head
16 Dental prosthesis for upper jaw
18 Dental prosthesis for lower jaw
20 Prosthetic tooth
22 Coronal side
24 Prosthetic tooth
26 Prosthesis base for lower jaw
28 Prosthesis base for upper jaw
100 First step
101 Second step
102 Third step (optional)
103 Fourth step
104 Fifth step
105 Sixth step
106 Seventh step
107 Eighth step

The invention claimed is:

1. A method for producing a guide rail which is provided for guiding a mobile milling head or cutting tool during the machining of prefabricated prosthetic teeth, wherein the method comprises the following steps:
   (A) generating or providing a virtual 3D model of a dental prosthesis with a virtual model of a prosthesis base as a gum imitation and with at least one virtual model of at least one machined prosthetic tooth to be arranged in the prosthesis base to reproduce at least one tooth;
   (B) calculating a volume to be removed from at least one prefabricated prosthetic tooth by comparing the at least one virtual model of the at least one machined prosthetic tooth with at least one virtual model of the at least one prefabricated prosthetic tooth using a CAD method;
   (C) generating a virtual model of a guide rail using a CAD method, which guide rail is fixed or fixable to a mount for fastening the at least one prefabricated prosthetic tooth, wherein the guide rail is modeled such that (a) the mount is positioned relative to the guide rail and (b) the at least one prefabricated prosthetic tooth is fastened in the mount in an orientation whereby the guide rail enables guidance of at least one milling head and/or at least one cutting tool of known dimensions in such a manner that the volume to be removed from the at least one prefabricated prosthetic tooth is traversed with the at least one milling head and/or the volume to be removed from the at least one prefabricated prosthetic tooth is cut away with the at least one cutting tool; and
   (D) producing a physical guide rail on the basis of the virtual model of the guide rail using a CAM method.

2. The method according to claim 1, wherein the guide rail enables or compels guidance of the at least one milling head and/or at least one cutting tool along a line or along a spatial area.

3. The method according to claim 1, comprising in step (C) generating a virtual model of the mount using a CAD method and in step (D) producing a physical mount on the basis of the virtual model of the mount using a CAM method.

4. The method according to claim 3, comprising modeling the mount such that the volume to be removed of the at least one prefabricated prosthetic tooth projects out from the mount or only the volume to be removed of the at least one prefabricated prosthetic tooth projects out from the mount.

5. The method according to claim 4, wherein the mount abuts the at least one prefabricated prosthetic tooth at all adjoining surfaces of the volume to be removed.

6. The method according to claim 1, comprising in step (C) modeling fastening elements on the virtual model of the guide rail or on a virtual model of the mount or on the virtual models of the guide rail and the mount by means which the guide rail and the mount are fixable relative to one another in a unique position and orientation.

7. The method according to claim 6, comprising after step (D) fixing the physical guide rail and the physical mount to one another via the fastening elements.

8. The method according to claim 1, comprising in step (B) calculating at least one boundary line which delimits the volume to be removed on the surface of the at least one virtual model of the prefabricated prosthetic tooth.

9. The method according to claim 8, comprising in step (C) generating at least one virtual model of at least one jig as the mount of the guide rail, wherein the at least one jig has an inner surface, wherein the inner surface corresponds in places to a negative mold of the at least one prefabricated prosthetic tooth, wherein the at least one jig has at least one opening in the at least one virtual model, which opening is delimited by the at least one boundary line, and wherein the surfaces of the at least one virtual model of the at least one jig are shaped such that the at least one virtual model of the at least one prefabricated prosthetic tooth is insertable without overlap into the at least one virtual model of the at least one jig.

10. The method according to claim 9, comprising in step (D) producing at least one physical jig as a mount of the guide rail on the basis of the at least one virtual model of the at least one jig using a CAM method.

11. The method according to claim 1, comprising modeling the guide rail such that the orientation of a pivot shaft of the at least one milling head and/or a location of a cutting edge of the at least one cutting tool does not change during guidance in the guide rail and the pivot shaft or the location of the cutting edge is only translationally displaced.

12. The method according to claim 11, comprising during modeling of the guide rail modeling the mount to fit or modeling the fastening of the mount on the guide rail to fit or modeling the mount to fit and modeling the fastening of the mount on the guide rail to fit.

13. The method according to claim 1, comprising generating the virtual model of the guide rail with two mutually opposing guide rail parts, wherein the mount for fastening the at least one prefabricated prosthetic tooth is arranged between the guide rail parts and the at least one milling head or the at least one cutting tool or the at least one milling head and the at least one cutting tool is guided between the guide rail parts.

14. The method according to claim 13, wherein the two guide rail parts have identical guideways for guiding the at least one milling head or the at least one cutting tool or the at least one milling head and the at least one cutting tool.

15. The method according to claim 1, wherein the mount is a multipart mount in which the at least one prefabricated prosthetic tooth is detachably fastenable.

16. The method according to claim 15, wherein the parts of the multipart mount are detachably fastenable to one another.

17. The method according to claim 1, comprising generating the at least one virtual model of at least the machined prosthetic tooth to be arranged in the prosthesis base in step (A) such that the basal surface of the at least one virtual model of the at least one machined prosthetic tooth is shapeable by at least one milling head of a known rotationally symmetrical shape which rotates about a pivot shaft thereof and is guided along a line.

18. A method for basally shortening prosthetic teeth for producing a dental prosthesis including a method according to claim 1, comprising after step (D) basally machining at least one prefabricated prosthetic tooth which is or has been fastened in the mount with the at least one milling head and/or the at least one cutting tool, wherein the at least one milling head and/or the at least one cutting tool is guided with the physical guide rail, wherein in so doing the volume to be removed of the at least one prefabricated prosthetic tooth is milled away.

19. The method according to claim 18, wherein the at least one milling head and/or the at least one cutting tool is guided manually in the physical guide rail.

20. The method according to claim 18, comprising
using a plurality of milling heads having different milling head diameters in the method, wherein the milling heads of increasing diameter are guided in succession in the physical guide rail, and/or
using a plurality of cutting tools with different cutting planes in the method, wherein the guided cutting edges have cutting planes which cut successively progressively deeper into the basal sides of the prosthetic teeth.

21. A method for producing a dental prosthesis including a method for basally shortening prosthetic teeth according to claim 18, comprising, after basal shortening of the at least one prefabricated prosthetic tooth, fastening or adhesively bonding the at least one machined prosthetic tooth in a prosthesis base as a gum imitation.

22. The method according to claim 21, comprising producing the prosthesis base by a CAM method on the basis of the virtual model of the prosthesis base according to step (A).

23. A system for producing a guide rail which is provided for guiding a mobile milling head or cutting tool during the machining of prefabricated prosthetic teeth, the system comprising:
a memory device; and
a processing device operatively coupled to the memory device, the processing device to:
(A) generate or provide a virtual 3D model of a dental prosthesis with a virtual model of a prosthesis base as a gum imitation and with at least one virtual model of at least one machined prosthetic tooth to be arranged in the prosthesis base to reproduce at least one tooth;
(B) calculate a volume to be removed from at least one prefabricated prosthetic tooth by comparing the at least one virtual model of the at least one machined prosthetic tooth with at least one virtual model of the at least one prefabricated prosthetic tooth using a CAD method;
(C) generate a virtual model of a guide rail using a CAD method, which guide rail is fixed or fixable to a mount for fastening the at least one prefabricated prosthetic tooth, wherein the guide rail is modeled such that (a) the mount is positioned relative to the guide rail and (b) the at least one prefabricated prosthetic tooth is fastened in the mount in an orientation whereby the guide rail enables guidance of at least one milling head and/or at least one cutting tool of known dimensions in such a manner that the volume to be removed from the at least one prefabricated prosthetic tooth is traversed with the at least one milling head and/or the volume to be removed from the at least one prefabricated prosthetic tooth is cut away with the at least one cutting tool; and
(D) produce a physical guide rail on the basis of the virtual model of the guide rail using a CAM method.

24. The system according to claim 23, wherein the apparatus comprises a CAM apparatus for producing the guide rail or a 3D printer for producing the guide rail or is connected or connectable to such a CAM apparatus or such a 3D printer via an interface of the apparatus for implementing method step (D).

* * * * *